United States Patent [19]
Yamamoto et al.

[11] Patent Number: 4,828,916
[45] Date of Patent: May 9, 1989

[54] PLATE-LIKE MAGNETOPLUMBITE TYPE FERRITE PARTICLES FOR MAGNETIC RECORDING AND MAGNETIC RECORDING MEDIA USING THE SAME

[75] Inventors: Shigehisa Yamamoto; Ryuji Fujita; Kazutoshi Sanada; Nanao Horiishi, all of Hiroshima, Japan

[73] Assignee: Toda Kogyo Corporation, Hiroshima, Japan

[21] Appl. No.: 130,592

[22] Filed: Dec. 9, 1987

[30] Foreign Application Priority Data

Dec. 27, 1986 [JP] Japan .................. 61-315669
Mar. 20, 1987 [JP] Japan .................. 62-67418

[51] Int. Cl.$^4$ .................................. G11B 5/70
[52] U.S. Cl. ....................... 428/329; 428/402; 428/694; 428/900
[58] Field of Search ............ 428/328, 329, 695, 694, 428/900, 402

[56] References Cited

U.S. PATENT DOCUMENTS

| | | | |
|---|---|---|---|
| 4,493,874 | 1/1985 | Kubo | 428/403 |
| 4,511,617 | 4/1985 | Hideyama | 428/329 |
| 4,529,524 | 7/1985 | Nagai et al. | 252/62.59 |
| 4,539,129 | 9/1985 | Nagai et al. | 252/62.63 |
| 4,548,801 | 10/1985 | Nagai et al. | 252/62.63 |
| 4,561,988 | 12/1985 | Nagai et al. | 252/62.59 |
| 4,584,242 | 4/1986 | Nagai | 428/403 |
| 4,585,568 | 4/1986 | Nagai et al. | 252/62.59 |
| 4,636,433 | 1/1987 | Kubo | 428/329 |
| 4,677,024 | 6/1987 | Kitahata | 428/328 |
| 4,698,182 | 10/1987 | Nagai et al. | 252/62.59 |
| 4,699,840 | 10/1987 | Yashiro | 428/694 |
| 4,752,407 | 6/1988 | Nagai et al. | 252/62.59 |

FOREIGN PATENT DOCUMENTS 56-149328 11/1981 Japan .
61-152003 7/1986 Japan .

*Primary Examiner*—Paul J. Thibodeau
*Attorney, Agent, or Firm*—Nixon & Vanderhye

[57] ABSTRACT

Disclosed herein are Ba-containing plate like magnetoplumbite type ferrite particles for magnetic recording having the composition of $AO \cdot n\{(Fe_{1-x}M_x)_2O_3\}$ (wherein A represents Ba or Ba and Sr, M represents Zn and Ti, or Zn, Co and Ti, $n=6.5-11.0$, and $x=0.05-0.25$) and the change of coercive force of said particles at a temperature of 20°–120° C. in the range of $-2.0$ Oe/°C. to $+2.0$ Oe/°C., and magnetic recording media using the same.

6 Claims, 1 Drawing Sheet

(×100000)

PLATE-LIKE MAGNETOPLUMBITE TYPE FERRITE PARTICLES FOR MAGNETIC RECORDING AND MAGNETIC RECORDING MEDIA USING THE SAME

BACKGROUND OF THE INVENTION

The present invention relates to the plate-like magnetoplumbite type ferrite particles for magnetic recording comprising the Ba-containing plate-like magnetoplumbite type ferrite particles having the composition of $AO \cdot n\{(Fe_{1-x}M_x)_2O_3\}$, wherein A represents Ba or Ba and Sr, M represents Zn and Ti, or Zn, Co and Ti, $n=6.5-11.0$, and $x=0.05-0.25$ and the change of coercive force of the particles at a temperature of $20°-120°$ C. in the range of $-2.0$ Oe/° C. to $+2.0$ Oe/° C., and magnetic recording media made by coating on a substrate a resin composition containing the Ba-containing plate-like magnetoplumbite type ferrite particles having the composition of $AO \cdot n\{(Fe_{1-x}M_x)_2O_3\}$, wherein A represents Ba or Ba and Sr, M represents Zn and Ti, or Zn, Co and Ti, $n=6.5-11.0$, and $x=0.05-0.25$, the change of coercive force of the magnetic recording media at a temperature of $20°-90°$ C. being in the range of $-2.0$ Oe/° C. to $+2.0$ Oe/° C.

With the advancement of technology for longer recording time, and smaller size and weight of the magnetic video and audio recording and reproducing devices in recent years, the necessity has grown for the higher performance of the magnetic recording media such as magnetic tapes, magnetic discs, etc. Especially, high-density recording by magnetic recording media is required acutely.

Magnetic recording media are generally produced by coating a resin composition containing magnetic particles on a substrate.

According to the conventional recording system, the acicular magnetic particles such as acicular $\gamma$-$Fe_2O_3$ particles or Co-coated acicular $\gamma$-$Fe_2O_3$ particles have been oriented in the longitudinal direction on the plane of the magnetic recording medium and recording has been made by making use of the remanent magnetization in the direction. For attaining high-density recording, it is necessary to shorten the recording wavelength. However, according to the conventional recording system, because of the necessity of shortening the major axis of the acicular magnetic particles for short wavelength recording, the influence of the dimagnetizing field between the particles would increase to cause a drop of reproducing output, so that this system was disadvantageous for high-density recording.

As a high-density recording system, there has been proposed recently a so-called perpendicular magnetic recording system in which recording is performed by making use of the remanent magnetization in the direction perpendicular to the longitude of the magnetic recording medium, and this system is reaching the stage of practical application.

According to this perpendicular magnetic recording system, since the magnetic particles are oriented in the direction perpendicular to the longitude of magnetic recording medium and arranged so that the particles of opposite magnetic polarities adjoin each other, there hardly arises the influence of diamagnetizing field between the particles even when short wavelength recording is conducted. Further, since the adjoining particles strengthen their magnetization each other, the drop of output is lessened. Thus, this system is suited for high-density recording.

As mentioned above, the development of perpendicular magnetic recording media capable of high-density recording is most acutely required at present. As such magnetic recording media, there are known ones made by coating on a substrate a resin composition containing the Ba-containing plate-like magnetoplumbite type ferrite particles as for instance disclosed in Japanese Patent Application Laid Open (Kokai) No. 55-86103(1980).

Extensive studies have been conducted in recent years for the development of plate-like magnetoplumbite type ferrite particles and practical use of the recording media coated with such particles, and in accordance with the advancement of such studies, request has mounted not only for the improvement of electro-magnetic performance and durability which are normally required for the recording media but also for the magnetic (especially coercive force) stability to temperature (hereinafter referred to simply as temperature stability).

Such request is based on the following fact. Magnetic recording is made by magnetizing the magnetic recording medium with a magnetic field generated by the magnetic head, but it becomes impossible to carry out the best mode of recording if the coercive force of the magnetic recording medium varies due to a rise of temperature caused by an invironmental change, even if the magnetic field of the magnetic head and the value of coercive force, which is a magnetization component of the recording media, have been adjusted at room temperature so as to allow the best mode of recording.

The properties such as electromagnetic performance of magnetic recording media are closely associated with the properties of the magnetic particles used therefor. Regarding the properties of the Ba-containing magnetoplumbite type ferrite particles, it is usually required of such particles that they have an average particle diameter of 0.01 to 0.3 $\mu$m and are excellent in dispersibility, that their coercive force can be controlled in the range of 300 to 2,000 Oe, and that the magnetization value is as high as possible.

Control of coercive force in the range of 300 to 2,000 Oe is necessary for enabling recording by the currently used ferrite type magnetic heads. For reducing the coercive force of plate-like magnetoplumbite type ferrite particles, it has been proposed to replace part of Fe(III) in the ferrite with Ti(IV) and Co(II), or Co(II) and divalent metal ions M(II) such as Mn, Zn, etc.

As to the magnetization value, it is required that such magnetization value is as large as possible. This is mentioned in, for instance, Japanese Patent Application Laid Open (Kokai) No. 56-149328 (1981) which states: "Magnetoplumbite ferrite used as a material for magnetic recording media is required to have as large a degree of saturation magnetization as possible . . ."

The requirement that the plate-like magnetoplumbite type ferrite particles for magnetic recording should be as small in size as possible, especially not greater than 0.3 $\mu$m, is also mentioned in many literatures. For instance, Japanese Patent Application Laid Open (Kokai) No. 56-125219 (1981) states: "The utility of perpendicular magnetic recording for longitudinal magnetic recording becomes apparent in the recording wavelength region below 1 $\mu$m. For conducting satisfactory recording and reproduction in this wavelength region, it is desirable that the crystal particle size of the ferrite particle is less than about 0.3 $\mu$m. However, since no desired ferromagnetism is provided when the crystal particle size becomes smaller than 0.01 μm, a crystal particle size in the range of 0.01 to 0.3 μm is practically required."

There is no end to the requirement for the improvement of properties of plate-like magnetoplumbite type ferrite particles for magnetic recording. The strong request for temperature stability in addition to the proper coercive force, large magnetization value and a proper average particle size is explained by the fact that while magnetic recording is made by magnetizing the magnetic particles in the magnetic recording medium with a magnetic field generated by the magnetic head, it becomes impossible to carry out the best mode of recording if the coercive force of the magnetic particels varies due to a rise of temperature caused by an environmental change, even if the magnetic field of the magnetic head and the value of coercive force, which is a magnetization component of the magnetic particles, have been adjusted at room temperature so as to allow the best mode of recording.

The Ba-containing plate-like magnetoplumbite type ferrite particels having a proper coercive force, a large magnetization, a proper average particle size and excellent temperature stability, and the magnetic recording media capable of high-density recording are most strongly required at present.

The plate-like magnetoplumbite type ferrite particles and the media coated with such particles are known as the particles and media that satisfy the property requirements, but the Ba-containing plate-like magnetoplumbite type ferrite particles tend to increase in coercive force as the temperature rises, and thus such particles are poor in temperature stability.

This phenomenon is evident from the disclosures in the June, 1986, issue of "METALS" (published by Agness) which states on page 10: "The coercive force of barium ferrite particles increases with the rise of temperature...", and on page 12: "The coercive force of magnetic recording media and the change of saturation magnetization by temperature are decided by the magnetic particles used. It has been confirmed that even in the barium ferrite media, the coercive force and saturation magnetization show the same characteristics as the temperature characteristics of magnetic particles shown in FIG. 4."

As means for improving the temperature stability of Ba-containing plate-like magnetoplumbite type ferrite particels, there is known, for instance, the method disclosed in Japanese Patent Application Laid Open (Kokai) No. 61-152003(1986).

According to the method of this Japanese Patent Application (Kokai) No. 61-152003 (1986), the plate-like barium ferrite particles containing the elements for reducing coercive force, such as Co(II) and Ti(IV), are heat-treated in a reducing atmosphere at 300°-700° C., but this method has the problem that the heat-treatment increases the coercive force more than twice that before the treatment, and it is difficult to control the coercive force to a proper level. Therefore, when a magnetic recording media is produced by using the Ba-containing plate-like magnetoplumbite type ferrite particles, the obtained magnetic recording media has an elevated coercive force, and as a result it is difficult to perform recording with a conventional ferrite-made magnetic head.

Thus, the establishment of a process for producing the Ba-containing plate-like magnetoplumbite type ferrite particles having a proper level of coercive force and excellent temperature stability has been strongly desired.

As a result of extensive studies for obtaining the Ba-containing plate-like magnetoplumbite type ferrite particles having a proper level of coercive force and excellent temperature stability, it has been found that the Ba-containing plate-like magnetoplumbite type ferrite particles having the composition of $AO.n\{(Fe_{1-x}M_x)_2O_3\}$ (wherein A represents Ba or Ba and Sr, M represents Zn and Ti, or Zn, Co and Ti, n=6.5-11.0, and x=0.05-0.25) and the change of coercive force at a temperature of 20°-120° C. in the range of −2.0 Oe/° C. to +2.0 Oe/° C., obtained by mixing Ba material, Fe material and substituting elements, viz. Zn material, Ti material and Co material, in the specified ratios, heating and calcining the mixture at a temperature of from 750° to 950° C. in the presence of a flux, crushing the calcined product and washing it with water and an acid, are the plate-like magnetoplumbite type ferrite particles having a proper level of coercive and excellent temperature stability, and magnetic recording media coated with such particles also have a proper level of coercive force and excellent temperature stability. The present invention has been attained on the basis of this finding.

SUMMARY OF THE INVENTION

In the first aspect of the present invention, there is provided Ba-containing plate-like magnetoplumbite type ferrite particles for magnetic recording having the composition of $AO.n\{(Fe_{1-x}M_x)_2O_3\}$ (wherein A represents Ba or Ba and Sr, M represents Zn and Ti, or Zn, Co and Ti, n=6.5-11.0 and x=0.05-0.25) and the change of coercive force of said particles at a temperature of 20°-120° C. in the range of −2.0 Oe/° C. to +2.0 Oe/° C.

In a second aspect of the present invention, there is provided magnetic recording media obtained by coating on a substrate a resin composition containing the Ba-containing plate-like magnetoplumbite type ferrite particles having the composition of $AO.n\{Fe_{1-x}M_x)_2O_3\}$ (wherein A represents Ba or Ba and Sr, M represents Zn and Ti, or Zn, Co and Ti, n=6.5-11.0 and x=0.05-0.25), the change of coercive force at a temperature of 20°-90° C. being in the range of −2.0 Oe/° C. to +2.0 Oe/° C.

BRIEF DESCRIPTION OF THE DRAWING

The figure is an electron microphotograph (×100,000) of the Ba-containing magnetoplumbite type ferrite particles obtained in Example 1.

DETAILED DESCRIPTION OF THE INVENTION

Figure 1:
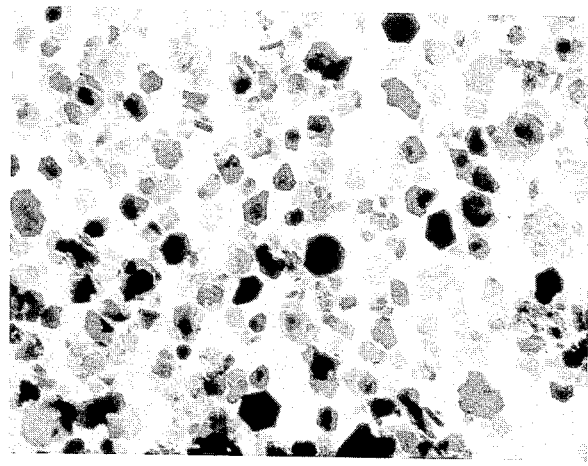

The heart in the present invention is the fact that the Ba-containing plate-like magnetoplumbite type ferrite particles having the composition of $AO.n\{(Fe_{1-x}M_x)_2O_3\}$ (wherein A represents Ba or Ba and Sr, M represents Zn and Ti, or Zn, Co and Ti, n=6.5-11.0 and x=0.05-0.25), and magnetic recording media obtained by coating a resin composition containing said particles on a substrate are excellent in temperature stability.

More specifically, the Ba-containing plate-like magnetoplumbite type ferrite particles according to the present invention show the change of coercive force thereof at a temperature of 20°-120° C. in the range of −2.0 Oe/° C. to +2.0 Oe/° C.

Especially, in the case where the Ba-containing plate-like magnetoplumbite type ferrite particles of the present invention contain Co in addition to Zn and Ti, the change of coercive force at a temperature of 20°-120° C. is in the range of $-1.5$ Oe/° C. to $+1.5$ Oe/° C.

Also, the magnetic recording media coated with a resin composition containing the Ba-containing plate-like magnetoplumbite type ferrite particles of the present invention are in the range of $-2.0$ Oe/° C. to $+2.0$ Oe/° C. in change of coercive force in the temperature range of 20°-90° C., and especially in the case of the magentic recording media coated with a resin composition containing the Ba-containing plate-like magnetoplumbite type ferrite particles containing Zn, Co and Ti, the change of coercive force at a temperature of 20°-90° C. is in the range of $-1.5$ Oe/° C. to $+1.5$ Oe/° C.

The reason why the Ba-containing plate-like magnetoplumbite type ferrite particles with excellent temperature stability can be obtained by the process of the present invention is not yet definitely known, but in view of the fact that the Ba-containing plate-like magnetoplumbite type ferrite particles with excellent temperature stability can not be obtained either in the case where the Ba-containing plate-like magnetoplumbite type ferrite particles have the composition of $AO.n\{(Fe_{1-x}M_x)_2O_3\}$ in which n is outside the range of 6.5-11.0 or in the case where particles have the composition of $AO.n\{(Fe_{1-x}M_x)_2O_3\}$ in which n is 6.5-11.0, but part of Fe(III) in the ferrite is substituted with Zn or Ti, it is considered that the realization of producing the Ba-containing plate-like magnetoplumbite type ferrite particles having excellent temperature stability owes to the synergistic effect of Zn and Ti substituting part of Fe(III) in the ferrite and the magnetoplumbite type ferrite particles having the specified composition.

The Ba-containing plate-like magnetoplumbite type ferrite particles according to the present invention have the composition of $AO.n\{(Fe_{1-x}M_x)_2O_3\}$ wherein n is 6.5-11.0 and x is 0.05-0.25.

When n is less than 6.5, the change of coercive force in the temperature range of 20°-120° C. becomes greater than $+2.0$ Oe/° C., and the object of the present inventin can not be attained.

When n is greater than 11.0, a non-magnetic phase or spinel ferrite phase may be allowed to exist in the composition, resulting in a reduced magnetization value.

When x is less than 0.05, the change of coercive force in the temperature range of 20°-120° C. becomes greater than $+2.0$ Oe/° C., and the object of the present invention can not be attained.

When x is greater than 0.25, there may exist a non-magnetic phase or spinel ferrite phase in the composition to reduce the magnetization value.

The Ba-containing plagte-like magnetoplumbite type ferrite particles of the present invention can be obtained by mixing a Ba material such as barium carbonate (if necessary, part of the Ba material may be substituted with an Sr material such as strontium carbonate), an Fe material such as hematite, magnetite, maghemite, goethite, etc., and substituting elements, viz. a Zn material such as zinc oxide, zinc carbonate, zinc hydroxide, etc., a Ti material such as titanium oxide and a Co material such as cobalt carbonate, cobalt hydroxide, basic cobalt carbonate ($2CoCO_3.3Co(OH)_2.H_2O$), etc. in the specified ratios, heating and calcining the thus obtained mixture at a temperature of from 750° to 950° C. in the presence of a flux, crushing the calcined product and washing it with water and an acid in the conventional method.

As the flux used in the present invention, one or more of the halides of alkali metals and alkali earth metals, sulfates, silicates and the like can be used.

The amount of such flux is 15 to 100% by weight based on the iron material.

When the amount of the flux is less than 15% by weight, the ferrite-forming reaction is not effected to a satisfactory degree, with the result that the unreacted material may remain and also the particle size distribution of the produced particles is broadened, so that, in this case, the object of the present invention can not be attained.

It is possible to obtain the Ba-containing plate-like magnetoplumbite type ferrite particles of the present invention even when the amount of the flux exceeds 100% by weight, but it is meaningless to let the flux exist in a greater amount than actually needed.

When the calcining temperature is less than 750° C., the ferrite-forming reaction is not effected sufficiently and the unreacted material remains.

When the calcining temperature exceeds 950° C., there takes place sintering of the particles and betrween the particles, so that the produced particles prove unsuited for use as magnetic particles for magnetic recording.

The magnetic recording media according to the present invention can be obtrained by coating a resin composition containing the Ba-containing plate-like magnetoplumbite type ferrite particles on a substrate by a conventional method.

The resin composition may be added with the usually used additives such as dispersant, lubricant, abrasive, antistatic agent, etc.

As the substrate for the magnetic recording media according to the present invention, there can be used the films of synthetic resins such as polyethylene terephthalate, polyethylene, polypropylene, polycarbonate, plolyethylene naphthalate, polyamide, polyamide-imide, polyimide, polysulfone, etc., foils and plates of metals such as aluminum, stainless steel, etc., and various types of paper which are commonly used in the production of magnetic recording media.

As the resins usable in the present invention, vinyl chloride-vinyl acetate copolymer, vinyl chloride-vinyl acetate-maleic acid urethane elastomer, butadiene-acrylonitrile copolymer, polyvinyl butyral, cellulose derivatives such as nitrocellulose, polyester resin, synthetic rubber resins such as polybutadiene, epoxy resin, polyamide resin, polyisocyanate polymer, radiation cured type acrylic urethane resin, and mixtures thereof, which are generally used in the production of magnetic recording media may be exemplified.

Owing to their composition of $AO.n\{(Fe_{1-x}M_x)_2O_3\}$ (wherein A represents Ba or Ba and Sr, M represents Zn and Ti, or Zn, Co and Ti, n is 6.5-11.0, and x is 0.05-0.25), the Ba-containing plate-like magnetoplumbite type ferrite particles according to the present invention have a proper coercive force and excellent temperature stability, especially the change of coercive force at a temperature of 20°-120° C. in the range of $-2.0$ Oe/° C. to $+2.0$ Oe/° C., so that they are best suited for use as plate-like magnetoplumbite type ferrite particles for magnetic recording which are most keenly required at present. To be more specific, the Ba-containing plate-like magnetoplumbite type ferrite particles of the present invention are the ones having an average particles diameter of 0.05 to 0.3 μm, a coercive force of 300 to 2,000 Oe, preferably 500 to 1,700 Oe, a magnetization of 45 to 60 emu/g, preferably 50 to 60 emu/g, and a temperature stability (the change of coercive force in the temperature range of 20°-120° C.) of −2.0 Oe/° C. to +2.0 Oe/° C., preferably −1.5 Oe/° C. to +1.5 Oe/° C.

Further, because of use of the Ba-containing plate-like magnetoplumbite type ferrite particles having a proper coercive force and excellent temperatue stability, the magnetic recording media according to the present invention also have a proper coercive force and excellent temperature stability, especially the change of coercive force at a temperature of 20°-90° C. in the range of −2.0 Oe/° C. to +2.0 Oe/° C., so that these media are best suited for use as magnetic recording media for high-density recording which are most intensely required at present.

More specifically, the magnetic recording media according to the present invention are the ones having a coercive force of 300 to 2,000 Oe, preferably 550 to 1,700 Oe, and a temperature stability (the change of coercive force in the temperature range of 20°-90° C.) of −2.0 Oe/° C. +2.0 Oe/° C., preferably −1.5 Oe/° C. +1.5 Oe/° C.

The present invention will hereinafter be described with reference to the examples and comparative examples, but the invention is in no way limited by these examples.

In the following Examples and Comparative Examples, the average diameter of the particles was measured by electron microphotographs.

The magnetic properties of the Ba-containing magnetoplumbite type ferrite particles were determined under an external magnetic field of 10 KOe by using "Sample Vibrating Type Magnetometer VSM-3S-15" (made by Toei Kogyo KK), and the properties of the magnetic recordingbg media were determined by applying an external magnetic field of 10 KOe vertically to the surface of each magnetic recording medium.

The temperature stability of the Ba-containing plate-like magnetoplumbite type ferrite particles and the magnetic recording media was shown by the value (Oe/° C.) obtained by dividing the difference between coercive force at 20° C. and that at 90° C. by the temperature difference (70° C.) in the case of the magnetic recording media, and by dividing the difference between coercive force at 20° C. and that at 120° C. by the temperature difference (100° C.) in the case of the Ba-containing magnetoplumbite type ferrite particles.

Preparation of Ba-containing plate-like magnetoplumbite type ferrite particles:

EXAMPLE 1

195 g of barium carbonate, 1,070 g of magnetite, 131.8 g of zinc oxide, 116.2 g of titanium oxide and a flux comprising 250 g of NaCl and 250 g of $Na_4SiO_4$ were supplied into an alumina-made crucible and heated and calcined at 800° C. for 1.5 hours by using an electric furnace. The calcined product was crushed in the conventional method and, after removing the flux by washing, filtered and dried to obtain the brown particles.

The thus obtained ferromagnetic brown particles had an average diameter of 0.07 μm from an electron microphotograph shown in FIG. 1, and the results of fluorescent X-ray analysis and X-ray diffraction confirmed that these particles were the magnetoplumbite type ferrite particles having the composition of $BaO.8.19\{(Fe_{0.818}Zn_{0.096}Ti_{0.860})_2O_3\}$.

These particles of the composition showed a coercive froce Hc of 530 Oe, a magnetization of 53.4 emu/g and a temperature stability of −1.3 Oe/° C.

EXAMPLES 2-7 AND COMPARATIVE EXAMPLES 1-2

Ba-containing plate-like magnetoplumbite type ferrite particles were obtained in the same process as Example 1 except that the kind and amount of the Fe material, the kind and amount of the Ba or Ba and Sr material, the kind and amount of the flux, and the calcining temperature and time were changed.

The main preparation conditions used in the Examples and Comparative Examples are shown in Table 1, and the properties of the obtained particles are shown in Table 2.

Production of magnetic recording media:

EXAMPLE 8

100 parts by weight of the Ba-containing magnetoplumbite type ferrite particles obtained in Example 1, 14 parts by weight of VAGH (vinyl choloride-vinyl acetate-vinyl alcohol copolymer, made by U.C.C. Ltd., USA), 1 part by weight of myristic acid, 30 parts by weight of toluene, 30 parts by weight of metyl ethyl ketone, 1 part by weight of $Al_2O_3$ powder and 2 parts by weight of carbon black were kneaded together for 90 minutes by using a kneader. The kneaded material was diluted by adding 45 parts by weignt of toluene and 45 parts by weight of methyl ethyl ketone and then mixed and dispersed for 3 hours by a sand grinder.

To the resulting dispersion was added 140 parts by weight of a methyl ethyl ketone solution containing 14 parts by weight of solids of a polyurethane resin (Nipporan 2304, made by Nippon Polyurethane Kogyo KK), followed by 30-minute mixing and filtration, and the filtered material was mixed with 3 parts by weight of coronate L (a trifunctional low-molecular weight isocyanate compound, made by Nippon Polyurethane Kogyo KK) to prepare a magnetic coating print.

This magnetic coating print was coated on a 12 μm thick polyester base film and then dried to form a 4 μm thick magnetic coat, and this coated film was calendered and then cut to a width of 3.81 mm to make a magnetic tape.

The thus obtained magnetic tape showed the following magnetic properties: coercive force of 570 Oe; saturation flux density Bm of 1,340 Gauss; residual flux density Br of 427 Gauss; squareness ratio Br/Bm of 0.319. It also showed a temperature stability of −1.4 Oe/° C.

EXAMPLES 9-14 AND COMPARATIVE EXAMPLES 3-4

Magnetic recording media were obtained in the same process as Example 8 except that the type of Ba-containing magnetoplumbite type ferrite particles used was changed.

The properties of the obtained magnetic recording media are shown in Table 3.

TABLE 1

| Example | Preparation of Ba-containing magnetoplumbite type ferrite particles |
|---|---|
| | Ba or Ba and |

TABLE 1-continued

| Example and Comp. Example | Fe material Kind | Amount (g) | Sr material Kind | Amount (g) | Zn material Kind | Amount (g) | Ti material Kind | Amount (g) |
|---|---|---|---|---|---|---|---|---|
| Example 1 | $Fe_3O_4$ | 1070 | $BaCO_3$ | 195 | ZnO | 131.8 | $TiO_2$ | 116.2 |
| Example 2 | $\alpha\text{-}Fe_2O_3$ | 990 | $BaCO_3$ | 245 | " | 61.8 | " | 39.5 |
| Example 3 | FeOOH | 1200 | $BaCO_3$ | 200 | " | 85.3 | " | 54.0 |
| Example 4 | $Fe_3O_4$ | 1315 | $BaCO_3$ | 170 | " | 122.2 | " | 64.2 |
| Example 5 | $\gamma\text{-}Fe_2O_3$ | 1280 | $Ba(OH)_2$ | 155 | " | 62.6 | " | 64.8 |
| Example 6 | $\gamma\text{-}Fe_2O_3$ | 1105 | $BaCO_3$ | 190 | $ZnCO_3$ | 107.8 | " | 68.0 |
| Example 7 | FeOOH | 1230 | $BaCO_3$ | 190 | " | 107.5 | " | 68.0 |
|  |  |  | $SrCO_3$ | 12.5 |  |  |  |  |
| Comp. Example 1 | $Fe_3O_4$ | 850 | $BaCO_3$ | 200 | — | — | " | 59.0 |
| Comp. Example 2 | $\gamma\text{-}Fe_2O_3$ | 930 | $BaCO_3$ | 180 | ZnO | 13.2 | " | 13.9 |

| Example and Comp. Example | Preparation of Ba-containing magnetoplumbite type ferrite particles | | | | | |
|---|---|---|---|---|---|---|
| | Co material | | Flux | | Calcining | |
| | Kind | Amount (g) | Kind | % by weight | Amount (g) | Temperature (°C.) | Time (hr.) |

| Example and Comp. Example | Co material Kind | Amount (g) | Flux Kind | % by weight | Amount (g) | Calcining Temperature (°C.) | Time (hr.) |
|---|---|---|---|---|---|---|---|
| Example 1 | — | — | NaCl | 1 | 500 | 800 | 1.5 |
|  |  |  | $Na_4SiO_4$ | 1 |  |  |  |
| Example 2 | — | — | $BaCl_2$ | 1 | 400 | 900 | 1.0 |
|  |  |  | $Na_4SiO_4$ | 1 |  |  |  |
| Example 3 | — | — | NaCl | 1 | 500 | 850 | 1.0 |
|  |  |  | $Na_4SiO_4$ | 1 |  |  |  |
| Example 4 | — | — | NaCl | 1 | 600 | 760 | 1.5 |
|  |  |  | $Na_4SiO_4$ | 1 |  |  |  |
|  |  |  | $Na_2SO_4$ | 0.2 |  |  |  |
| Example 5 | Basic cobalt carbonate | 22.8 | NaCl | 1 | 450 | 800 | 1.5 |
|  |  |  | $Na_4SiO_4$ | 1 |  |  |  |
| Example 6 | Cobalt hydroxide | 11.0 | NaCl | 1 | 600 | 850 | 1.5 |
|  |  |  | $Na_4SiO_4$ | 1 |  |  |  |
|  |  |  | $Na_2CO_3$ | 0.2 |  |  |  |
| Example 7 | Cobalt hydroxide | 11.2 | NaCl | 1 | 700 | 900 | 1.0 |
|  |  |  | $Na_4SiO_4$ | 1 |  |  |  |
| Comp. Example 1 | Basic cobalt carbonate | 78.6 | NaCl | 1 | 200 | 900 | 1.0 |
|  |  |  | $Na_4SiO_4$ | 1 |  |  |  |
| Comp. Example 2 | — | — | NaCl | " | 300 | 850 | 1.5 |
|  |  |  | $Na_4SiO_4$ |  |  |  |  |

TABLE 2

| Example and Comp. Example | Ba-containing magnetoplumbite type ferrite particles | | | | |
|---|---|---|---|---|---|
| | Composition | Average diameter (μm) | Coercive force (Oe) | Magnetization (emu/g) | Temperature stability (Oe/°C.) |
| Example 1 | $BaO \cdot 8.19\{(Fe_{0.818}Zn_{0.0956}Ti_{0.0860})_2O_3\}$ | 0.07 | 530 | 53.4 | −1.3 |
| Example 2 | $BaO \cdot 6.81\{(Fe_{0.908}Zn_{0.0558}Ti_{0.0363})_2O_3\}$ | 0.12 | 1600 | 56.5 | +0.97 |
| Example 3 | $BaO \cdot 7.61\{(Fe_{0.887}Zn_{0.0688}Ti_{0.0443})_2O_3\}$ | 0.10 | 850 | 54.7 | +0.25 |
| Example 4 | $BaO \cdot 9.67\{(Fe_{0.881}Zn_{0.0777}Ti_{0.0416})_2O_3\}$ | 0.18 | 640 | 51.5 | −0.7 |
| Example 5 | $BaO \cdot 8.89\{(Fe_{0.899}Zn_{0.0433}Co_{0.0120}Ti_{0.0456})_2O_3\}$ | 0.09 | 930 | 54.2 | +0.05 |
| Example 6 | $BaO \cdot 7.85\{(Fe_{0.883}Zn_{0.0548}Co_{0.0076}Ti_{0.0542})_2O_3\}$ | 0.12 | 740 | 53.7 | +0.13 |
| Example 7 | $(0.92Ba \cdot 0.08Sr)O \cdot 7.54 \{(Fe_{0.880}Zn_{0.0544}Co_{0.0071}Ti_{0.0542})_2O_3\}$ | 0.17 | 1350 | 55.7 | +1.3 |
| Comp. Example 1 | $BaO \cdot 6.20\{(Fe_{0.882}Co_{0.0588}Ti_{0.0590})_2O_3\}$ | 0.07 | 750 | 54.2 | +3.5 |
| Comp. Example 2 | $BaO \cdot 6.59\{(Fe_{0.972}Zn_{0.0135}Ti_{0.0145})_2O_3\}$ | 0.13 | 1520 | 55.3 | +4.3 |

TABLE 3

| Example and Comp. Example | Kind of magnetic particles | Magnetic recording media | | | | |
|---|---|---|---|---|---|---|
| | | Coercive force Hc (Oe) | Saturation magnetic flux density Bm (Gauss) | Residual magnetic flux density Br (Gauss) | Squareness ratio Br/Bm | Temperature stability (Oe/°C.) |
| Example 8 | Example 1 | 570 | 1340 | 427 | 0.319 | −1.4 |
| Example 9 | Example 2 | 1630 | 1280 | 485 | 0.379 | +0.98 |
| Example 10 | Example 3 | 870 | 1430 | 452 | 0.316 | +0.23 |
| Example 11 | Example 4 | 680 | 1250 | 473 | 0.378 | −0.8 |
| Example 12 | Example 5 | 950 | 1390 | 522 | 0.376 | +0.07 |

TABLE 3-continued

| Example and Comp. Example | Kind of magnetic particles | Magnetic recording media | | | | |
|---|---|---|---|---|---|---|
| | | Coercive force Hc (Oe) | Saturation magnetic flux density Bm (Gauss) | Residual magnetic flux density Br (Gauss) | Squareness ratio Br/Bm | Temperature stability (Oe/°C.) |
| Example 13 | Example 6 | 750 | 1240 | 476 | 0.384 | +0.15 |
| Example 14 | Example 7 | 1370 | 1380 | 424 | 0.307 | +1.5 |
| Comp. Example 3 | Comp. Example 1 | 780 | 1440 | 475 | 0.330 | +3.7 |
| Comp. Example 4 | Comp. Example 2 | 1550 | 1520 | 547 | 0.360 | +4.5 |

What is claimed is:

1. Ba-containing plate-like magnetoplumbite type ferrite particles for magnetic recording having a composition of $AO.n\{(Fe_{1-x}M_x)_2O_3\}$, wherein A represents Ba or Ba and Sr, M represents Zn and Ti, or Zn, Co and Ti, n=6.5–11.0, and x=0.05–0.25, said particles having an average particle diameter of 0.05 to 0.3 $\mu$m and a change of coercive force (temperature stability) of said particles at a temperature of 20°–120° C. in the range of $-2.0$ Oe/° C. to $+2.0$ Oe/° C.

2. Ba-containing plate-like magnetoplumbite type ferrite particles according to claim 1, wherein said particles have the composition of $AO.n\{(Fe_{1-x}M_x)_2O_3\}$, wherein A represents Ba or Ba and Sr, M represents Zn, Co and Ti, n=6.5–11.0, and x=0.05–0.25, and the change of coercive force (temperature stability) of said particles at a temperature of 20°–120° C. is in the range of $-1.5$ Oe/° C. to $+1.5$ Oe/° C.

3. Ba-containing plate-like magnetoplumbite type ferrite particles according to claim 1, wherein a coercive force of said particles is 300 to 2,000 Oe and a magnetization of said particles is 45 to 60 emu/g.

4. Magnetic recording media obtained by coating on a substrate a resin composition containing Ba-containing plate-like magnetoplumbite type ferrite particles having the composition of $AO.n\{(Fe_{1-x}M_x)_2O_3\}$, wherein A represents Ba or Ba and Sr, M represents Zn and Ti, or Zn, Co and Ti, n=6.5–11.0, and x=0.05–0.25, said particles having an average particle diameter of 0.05 to 0.3 $\mu$m, the change of coercive force (temperature stability) of said magnetic recording media at a temperature of 20°–90° C. being in the range of $-2.0$ Oe/° C. to $+2.0$ Oe/° C.

5. Magnetic recording media according to claim 4, wherein said particles have the composition of $AO.n\{(Fe_{1-x}M_x)_2O_3\}$, wherein A represents Ba or Ba and Sr, M represents Zn, Co and Ti, n=6.5–11.0, and x=0.05–0.25, and the change of coercive force (temperature stability) of said magnetic recording media at a temperature of 20°–90° C. is in the range of $-1.5$ Oe/° C. to $+1.5$ OE/° C.

6. Magnetic recording media according to claim 4, wherein a coercive force of said magnetic recording media is 300 to 2,000 Oe.

* * * * *